April 1, 1930.   F. G. ROMIG   1,752,810
BLOWER
Filed Jan. 17, 1929
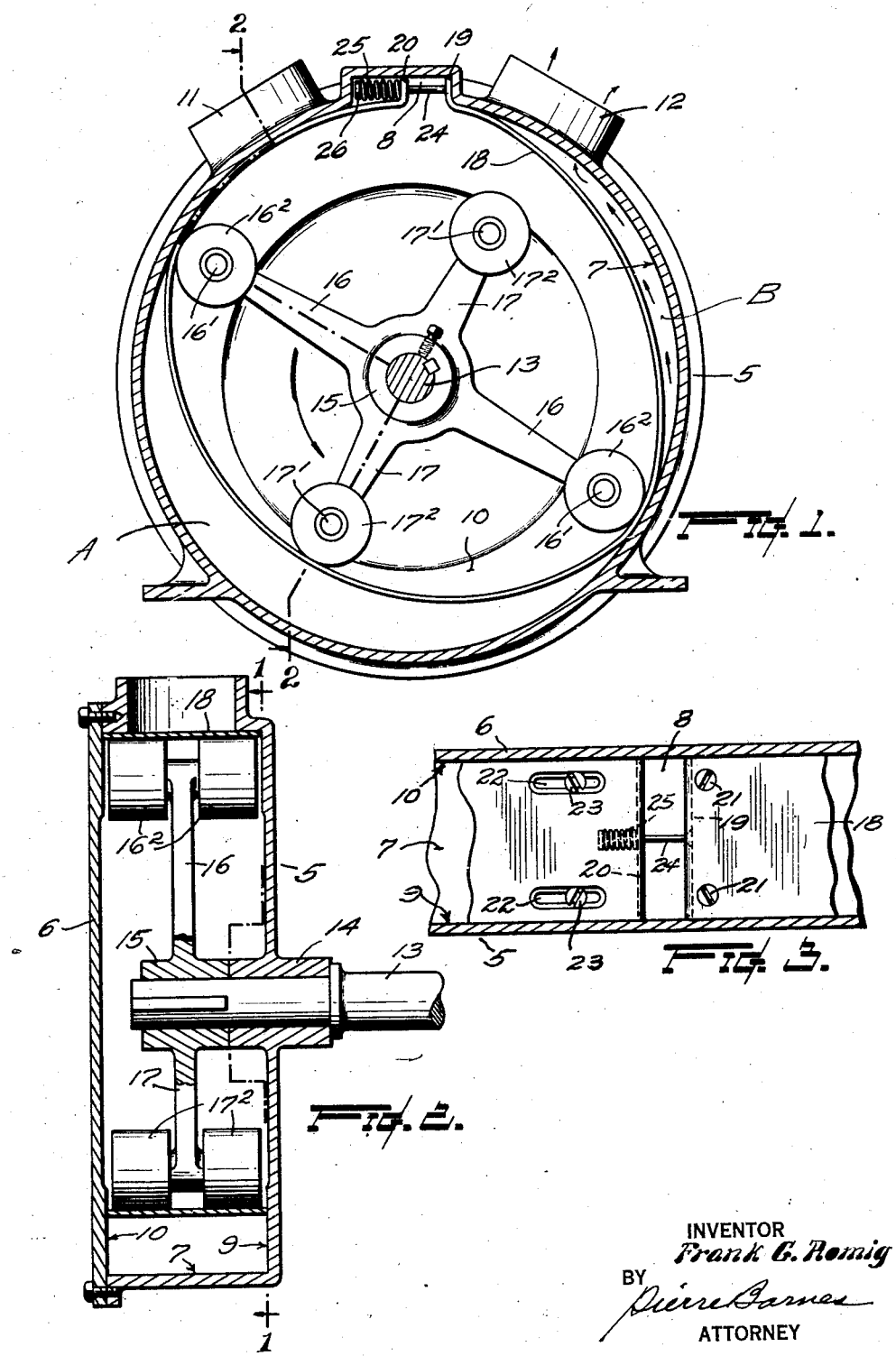
INVENTOR
Frank G. Romig
BY
Pierre Barnes
ATTORNEY Patented Apr. 1, 1930

1,752,810

UNITED STATES PATENT OFFICE

FRANK G. ROMIG, OF SEATTLE, WASHINGTON

BLOWER

Application filed January 17, 1929. Serial No. 333,138.

This invention relates to air-blowers. The object of my invention is to produce an efficient machine of this character, which will be inexpensive to operate, and of simple, compact and durable construction.

The blower is designed to operate noiselessly and with a substantially continuous even blast and, in consequence, is peculiarly adapted for supplying air to pipe organs, and combustion air to domestic heating furnaces.

The invention consists in the novel construction, adaptation, and combination of parts hereinafter described and claimed.

In the accompanying drawing,—

Figure 1 is a transverse vertical section on broken line 1—1 of Fig. 2 of a blower embodying my invention; and Fig. 2 is a longitudinal section taken substantially on broken line 2—2 of Fig. 1. Fig. 3 is a detail horizontal section of the casing with portions of the flexible piston member.

As shown, the blower comprises a casing having a body member 5 with a cylindrical chamber and a removable head 6. The inner periphery 7 of the casing is circular except for a recess or bay 8 provided for the purpose to be hereinafter described. The end walls of the casing are machined to provide opposing annular surfaces 9 and 10 contiguous with the peripheral surface 7 and disposed in planes parallel with each other and in right angular relation to the surface 7 and with respect to the axis of the casing. Provided in spaced relation circumferentially of the casing at opposite sides of the recess 8, respectively, are inlet and outlet ports extending through tubular boss elements 11 and 12 of the casing.

13 represents an operating shaft journaled in a bearing box 14 rigid with the casing body member 5 and extending axially into the casing chamber.

Keyed or otherwise secured to the shaft within said chamber is a hub 15 of a spider provided with pairs of arms 16 and 17 disposed diametrically of the chamber and in right angular relation with each other.

Carried in the outer ends of the respective arms 16 and 17 are stub shafts having laterally protruding stud elements, such as $16^1$ and $17^1$ in Fig. 1, upon which are mounted rollers $16^2$ and $17^2$, two for each arm.

The arms 16 are of lengths to position the rollers $16^2$ within a short distance—say $\frac{3}{32}$ of an inch—from the peripheral surface 7 of the chamber. The other arms 17, which are disposed in a plane at right angles from the plane of the arms 16, are shorter than the latter, to position the rollers $17^2$ at a greater distance from such peripheral surface. Provided within the casing chamber is a flexible piston 18 consisting of a thin strip of sheet metal having a length less than the circumferential length of the surface, a width equal to the distance between the annular surfaces 9 and 10 of the chamber, and a thickness equal to the spacing, as $\frac{3}{32}$ of an inch in the example given, between the peripheral surface 7 and the rollers which are carried by the longer arms 16 of the spider.

The ends of the piston are turned outwardly as ear elements 19 and 20 which extend into the casing recess 8. Said piston, at one side of said recess, is secured as by means of counter sunk headed screws 21 (Fig. 3) to the peripheral wall of the casing; and, at the other side of the recess, the piston is provided with slots 22 to receive screws 23 secured in said peripheral wall.

24 represents a bolt secured in the ear 19 and extending through an aperture of the other ear 20 to receive a coil spring 25 acting between the ear 20 and a nut 26 screwed on the threaded end of the bolt.

Said spring serves to produce a tension to the piston and compensates changes in the form of the latter during the operation of the blower.

In operation the spider is rotated in the direction indicated by the feathered arrow in Fig. 1 to cause the rollers $16^2$ to revolve against the inner or concave surface of the piston whereby the latter is flexed outwardly into contact with the inner peripheral surface 7 of the casing at diametrically opposite sides. Such contacted relation between the piston and the said surface occurs progressively under the action of the rollers $16^2$ of each spider arm 16 and, because of the piston being of less length than the periphery 7, causes the piston to be drawn inwardly of the casing chamber to provide cavities, as A and B in Fig. 1 for instance, at opposite sides of a plane produced through the centers of the rollers 16² diametrically of the casing.

By reason, moreover, of the piston ends being connected to the peripheral surface at opposite sides of the recess 8—which is located between the inlet and exhaust ports— the travel of the rollers 16² regulates the piston so as to produce cavities which act to successively suck air through the intake port, convey the air to and exhaust it, bellows-like, through the discharge port. The function of the spider rollers 17² is to prevent the piston being unduly distorted by increasing air pressures due to diminishing capacities of the cavities in conveying air from the inlet to the outlet.

The construction of the now preferred embodiment of the invention and the manner of its operation will be understood from the foregoing description.

What I claim, is,—

1. In a blower of the character described, the combination of a casing provided with a circular chamber and having circumferentially spaced air inlet and discharge openings, a flexible piston of less length than the circumference of said chamber, said piston being secured to the periphery of the casing intermediate said ports, an operating shaft extending axially into said chamber, a spider mounted upon said shaft, and a piston-actuating roller carried by the spider in spaced relation from the periphery of the chamber equal substantially to the thickness of the piston.

2. In a blower, the combination with a casing provided with a substantially circular chamber having in its periphery an air inlet and an air outlet, of a flexible piston of less length than the circumference of said chamber, one end of said piston being rigidly secured to the casing, an operating shaft, a spider mounted within the casing upon said shaft, said spider having two arms disposed at diametrically opposite sides of said shaft serving to press the piston into contactual relation with the periphery of the chamber.

3. In a blower, the combination with a casing provided with a substantially circular chamber having in its periphery an air inlet and an air outlet, of a flexible piston of less length than the circumference of said chamber, one end of said piston being rigidly secured to the casing, an operating shaft, a spider mounted within the casing upon said shaft, said spider having two long arms disposed at diametrically opposite sides of said shaft and two short arms disposed at opposite sides of the shaft and in right angular relation to said longer arms, and rollers carried at the ends of the respective arms, and the rollers of the longer arms serving to press the piston into contactual relation with the periphery of the chamber, the rollers of the shorter arms serving to limit the centripetal flexure of the piston.

4. In a blower, the combination with a casing provided with a substantially circular chamber having in its periphery an air inlet and an air outlet, of a flexible piston of less length than the circumference of said chamber, one end of said piston being rigidly secured to the casing, the other end of the piston being slidably connected to said casing, means including a spring to accommodate the movement of the second named end of the piston with respect to the casing, an operating shaft, a spider mounted within the casing upon said shaft, said spider having two long arms disposed at diametrically opposite sides of said shaft and two short arms disposed at opposite sides of the shaft and in right angular relation to said longer arms, and rollers carried at the ends of the respective arms, the rollers of the longer arms serving to press the piston into contactual relation with the periphery of the chamber, the rollers of the shorter arm serving to limit the centripetal flexure of the piston.

5. In a blower, the combination with a casing provided with a substantially circular chamber having in its periphery an air inlet and an air outlet, of a flexible piston of less length than the circumference of said chamber, one end of said piston being rigidly secured to the casing, the other end of the piston being slidably connected to said casing, means including a spring to accommodate the movement of the second named end of the piston with respect to the casing, an operating shaft, a spider mounted within the casing upon said shaft, said spider having two arms disposed at diametrically opposite sides of said shaft and rollers carried at the ends of the respective arms and serving to press the piston into contactual relation with the periphery of the chamber.

6. In a blower, a casing having a cylindrical chamber provided in its periphery with spaced apart air intake and exhaust ports, a piston within said chamber and arranged to provide a cavity between the piston and the inner periphery of the casing, and rotary devices for actuating said piston to cause said cavity to travel revolubly between said ports and actuate the piston into closed and open relation with said ports alternately.

Signed at Seattle, Washington, this 3rd day of January, 1929.

FRANK G. ROMIG.